(12) United States Patent
Song

(10) Patent No.: US 7,336,333 B2
(45) Date of Patent: Feb. 26, 2008

(54) IN-PLANE SWITCHING MODE LIQUID CRYSTAL DISPLAY DEVICE AND FABRICATION METHOD THEREOF

(75) Inventor: In-Duk Song, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/644,034

(22) Filed: Aug. 20, 2003

(65) Prior Publication Data
US 2004/0046918 A1 Mar. 11, 2004

(30) Foreign Application Priority Data
Aug. 21, 2001 (KR) .................. 10-2002-0049532

(51) Int. Cl.
*G02F 1/1339* (2006.01)
(52) U.S. Cl. .................. 349/153; 349/111; 349/149; 349/141
(58) Field of Classification Search ............. 349/153, 349/190, 139
See application file for complete search history.

(56) References Cited

U.S. PATENT DOCUMENTS

| | | | |
|---|---|---|---|
| 5,598,285 A | 1/1997 | Kondo et al. | |
| 5,737,051 A * | 4/1998 | Kondo et al. | ............. 349/149 |
| 5,838,037 A | 11/1998 | Masutani et al. | |
| 5,946,060 A | 8/1999 | Nishiki et al. | |
| 5,990,987 A | 11/1999 | Tanaka | |
| 6,028,653 A | 2/2000 | Nishida | |
| 6,097,454 A | 8/2000 | Zhang et al. | |
| 6,266,166 B1 | 7/2001 | Katsumata et al. | |
| 6,407,783 B1 * | 6/2002 | Ohgawara et al. | ............ 349/110 |
| 6,894,753 B2 * | 5/2005 | Song et al. | .................. 349/129 |
| 2002/0131003 A1 * | 9/2002 | Matsumoto | .................. 349/139 |
| 2002/0163615 A1 * | 11/2002 | Fujioka et al. | ............... 349/154 |

FOREIGN PATENT DOCUMENTS

| | | |
|---|---|---|
| JP | 9-5764 | 1/1997 |
| JP | 9-73101 | 3/1997 |

OTHER PUBLICATIONS

S. H. Lee et al., "High-Transmittance, Wide-Viewing-Angle Nematic Liquid Crystal Display Controlled by Fringe-Field Switching". Asia Display, 98, pp. 371-374.
S. Matsumoto et al., "LP-A: Display Characteristics of In-Plane-Switching (IPS) LCDs and a Wide-Viewing-Angle 14.5-in. IPS TFT-LCD". Euro Display '96, pp. 445-448.

(Continued)

*Primary Examiner*—David Nelms
*Assistant Examiner*—Richard H Kim
(74) *Attorney, Agent, or Firm*—McKenna Long & Aldridge LLP

(57) ABSTRACT

An in-plane switching mode liquid crystal display device including first and second substrates having an array region and a sealant region along a periphery of the array region, a sealant in the sealant region attaching the first and second substrates, a metallic black matrix formed in the sealant region and in the array region of the first substrate, a color filter on the metallic black matrix, an organic layer on the color filter and a liquid crystal layer between the first and second substrates.

11 Claims, 5 Drawing Sheets

OTHER PUBLICATIONS

H. Wakemoto et al., "An Advanced in-Plane-Switching Mode TFT-LCD", SID 97 Digest, pp. 929-932.

R. Kiefer et al., "In-Plane Switching of Nematic Liquid Crystals", Japan Display '92, pp. 547-550.

M. Ohta et al., "Development of Super-TFT-LCDs with In-Plane Switching Display Mode". Asia Display '95, pp. 707-710.

M. Oh-e et al., "Principles and Characteristics of Electro-Optical Behaviour with In-Plane Switching Mode". Asia Display '95, pp. 577-580.

* cited by examiner

IN-PLANE SWITCHING MODE LIQUID CRYSTAL DISPLAY DEVICE AND FABRICATION METHOD THEREOF

The present invention claims the benefit of Korean Patent Application No. 2002-49532 filed in Korea on Aug. 21, 2002, which is hereby incorporated by reference.

BACKGROUND OF THE INVENTION

1. Field of the Invention

The present invention relates to a liquid crystal display (LCD) device and, more particularly, to an in-plane switching mode liquid crystal display device and a fabrication method thereof capable of preventing sealant leakage.

2. Description of the Related Art

Generally, an LCD device is a display device in which data signals according to image information are individually supplied to liquid crystal cells arranged in a matrix form. Light transmittance of the liquid crystal cells is controlled to display a desired image. The LCD device includes a liquid crystal display panel with pixel-unit liquid crystal cells arranged in a matrix form and a driver integrated circuit (IC) for driving the liquid crystal cells. The liquid crystal display panel includes a color filter substrate and a thin film transistor array substrate, which face each other, and a liquid crystal layer filled in between the color filter substrate and the thin film transistor array substrate.

On the thin film transistor array substrate, data lines for transmitting data signals supplied from a data driver IC to the liquid crystal cells and gate lines for transmitting scan signals supplied from a gate driver IC to the liquid crystal cells cross one another. Liquid crystal cells are defined adjacent to the crossings of the data and gate lines. A data pad and a gate pad are provided at one end portion of each data line and gate line, respectively. A data signal is applied to a liquid crystal cell through a data line from the data driver IC. A scan signal is applied to a liquid crystal cell through a gate line from the gate driver IC. The gate driver IC sequentially supplies scan signals to the gate lines to sequentially select liquid crystal cells arranged in a matrix line by line. Data signals are supplied from the data driver IC to the liquid crystal cells of the selected line.

A common electrode and a pixel electrode having a finger structure are formed in each pixel, to apply a lateral electric field. By controlling a voltage applied to the common electrode and the pixel electrode, the light transmission ratio of each of the liquid crystal cells can be individually controlled. A thin film transistor is formed in each liquid crystal cell and used as a switching device. When a scan signal is supplied to the gate electrode of the thin film transistor through the gate line, a conductive channel is formed between the source electrode and the drain electrode. At this time, a data signal is supplied to the source electrode of the thin film transistor through the data line such that the data signal is supplied to the pixel electrode by way of the drain electrode. Accordingly, an electric field is applied to the liquid crystal layer of the corresponding liquid crystal cell.

FIG. 1 is a plan view showing a liquid crystal display panel having a thin film transistor array substrate and a color filter substrate attached in a facing manner in a general in-plane switching mode LCD device. As shown in FIG. 1, the liquid crystal display panel 100 includes an array region 113 in which liquid crystal cells are arranged in a matrix form; gate pads 114 formed at the end of the gate lines 108; and data pads 115 formed at the end of the data lines 109.

The gate pads 114 and the data pads 115 are formed at a peripheral region of a lower substrate 101, which is not overlapped with the upper substrate 102. Each of the gate pads 114 supplies a gate signal from the gate driver IC to the gate lines 108 of the array region 113. Each of the data pads 115 supplies a data signal from the data driver IC to the data lines 109 of the array region 113.

As shown in FIG. 1, data lines 109, to which image information is applied, and gate lines 108, to which a gate signal is applied, are arranged to cross each other on the lower substrate 101 of the array region 113. Adjacent to each of the crossings, there is a thin film transistor for switching a liquid crystal cell, a common electrode and a pixel electrode connected to the thin film transistor to drive a liquid crystal cell. Liquid crystal (not shown) is filled into a cell gap between the upper substrate 102 and the lower substrate 101. The liquid crystal is held in place by a sealant 116 formed along an outer edge of the array region 113.

In the upper substrate 102 of the array region 113, color filters are formed, which are separated into cell regions by a black matrix 103 to prevent light leakage. The thin film transistors (not shown), the gate lines 108, the data lines 109, a part of each of the gate pads 114 and a part of each of the data pads 115 of the lower substrate are also covered by the black matrix 103. In FIG. 1, only a black matrix 103 formed at an outer edge of the array region 113 is shown. A metal material, such as Cr, can be used as the black matrix 103. However, because a metal material can affect the lateral electric field between the pixel electrode and the common electrode, a resin black matrix is preferably used.

FIG. 2 is a sectional view along line II-II in the liquid crystal display panel of in FIG. 1. As shown in FIG. 2, liquid crystal 139 is filled in between the upper substrate 102 and the lower substrate 101. The liquid crystal 139 is held in place by sealant 116 along the periphery of the upper substrate 102 and the lower substrate 101. A specified cell gap is maintained by a spacer 105 disposed within the liquid crystal 139. The lower substrate 101 includes a transparent substrate 131, a gate pad 114 to which a scan signal is applied from the gate driver IC, a thin film transistor (TFT), a common electrode 133 and a pixel electrode 137.

The TFT includes a gate electrode 132, source electrode 137a, a drain electrode 137b and a semiconductor layer 135. A gate insulating layer 134 is formed between the gate electrode 132 and the semiconductor layer 135. An ohmic contact layer 136 is formed between the semiconductor layer 135 and the source and drain electrodes 137a and 137b.

Also, in the array region, the common electrode 133, which is formed when the gate electrode 132 is formed, and the pixel electrode 137, which is formed when the source/drain electrodes 137a and 137b are formed, are spaced apart at a predetermined interval across the lower substrate 101. A passivation layer 138 is formed over the entire surface of the thin film transistor (TFT) and the array region.

Referring to the upper substrate 102, the black matrix 103 and the color filter 122 are formed on a transparent substrate 121. An overcoat layer 123 for planarization is formed on the black matrix 103 and the color filter 122. In the case of a small-sized panel such as in a notebook computer, the black matrix 103 is formed at an outer edge of the upper substrate 102 and overlaps the sealant 116. However, because the black matrix 103 is made of the resin, its adhesion to the substrate 121 is weak such that the black matrix 103 will come off the substrate 121 after frequent shaking of the substrate. Thus, liquid crystal may leak because of a crack that may subsequently occur in the overcoat layer 123 or the sealant 116.

FIG. 3 is a sectional view of another related art LCD device. As shown in FIG. 3, in the case of forming the black matrix of Cr, the adhesive strength between the sealant 116 and the black matrix 103a is improved. However, the Cr black matrix affects the electric field between the pixel electrode 137 and the common electrode 133 such that cross-talk can occur, which degrades the picture rendering capability of the liquid crystal display panel.

SUMMARY OF THE INVENTION

Accordingly, the present invention is directed to an in-plane switching mode liquid crystal display device and a fabrication method thereof that substantially obviates one or more of the problems due to limitations and disadvantages of the related art.

An object of the present invention is to provide an in-plane switching mode LCD device and a method for fabricating thereof that prevents leakage of liquid crystal.

Another object of the present invention is to provide an in-plane switching mode LCD device and a method for fabricating thereof that prevents cross-talk.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the in-plane switching mode liquid crystal display device includes first and second substrates having an array region and a sealant region along a periphery of the array region, a sealant in the sealant region attaching the first and second substrates, a metallic black matrix formed in the sealant region and in the array region of the first substrate, a color filter on the metallic black matrix, an organic layer on the color filter and a liquid crystal layer between the first and second substrates.

In another aspect of the present invention, a method for fabricating an in-plane switching mode liquid crystal display device is providing first and second substrates having a sealant region and an array region, forming a metallic black matrix in the sealant region and in the array region of the first substrate, forming a color filter on the metallic black matrix, forming an organic layer on the color filter, forming a sealant in the sealant region and attaching the first and second substrates by the sealant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
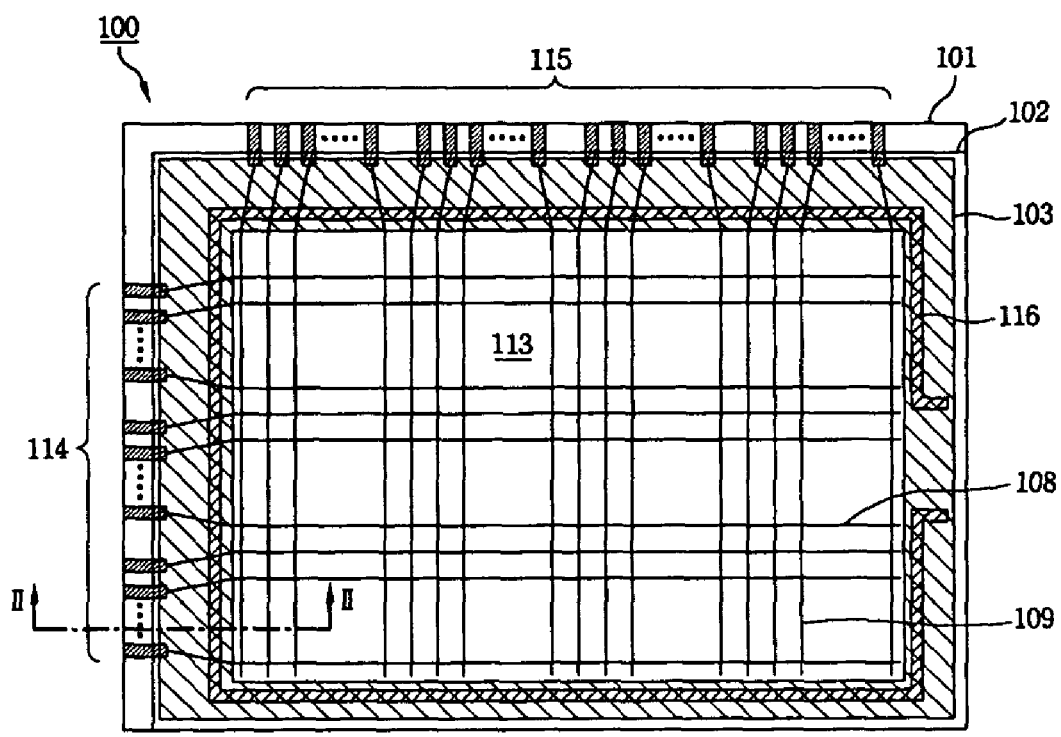
FIG. 1 is a plan view showing a liquid crystal display panel having a thin film transistor array substrate and a color filter substrate attached in a facing manner in a general in-plane switching mode LCD device.
Figure 2:
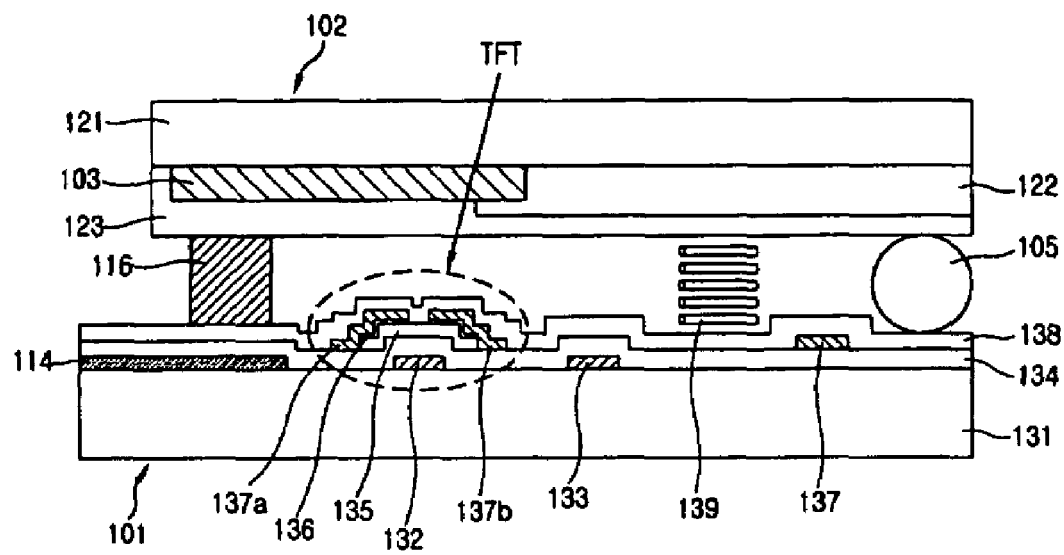
FIG. 2 is a sectional view along line II-II in the liquid crystal display panel of FIG. 1.
Figure 3:
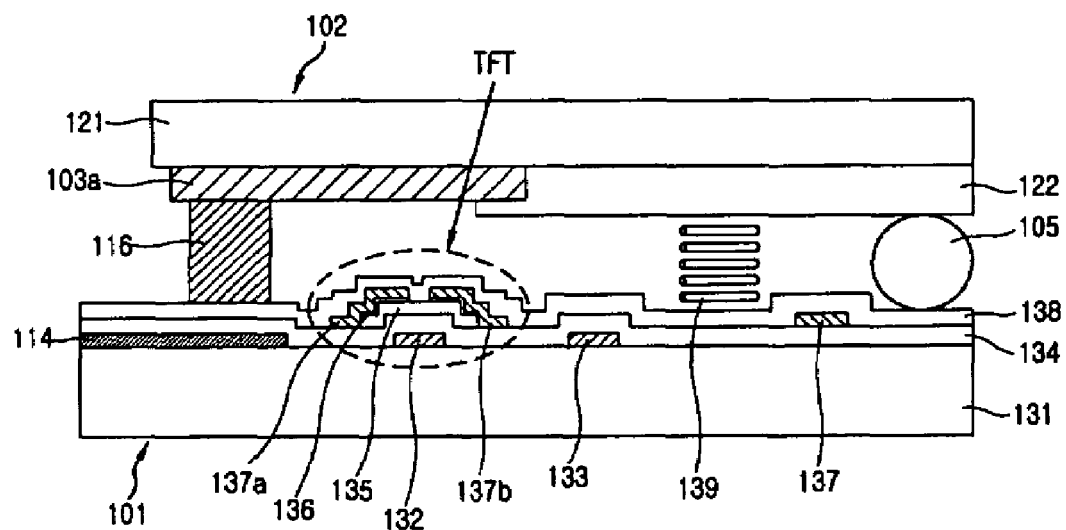
FIG. 3 is a sectional view of another related art LCD device.
Figure 4:
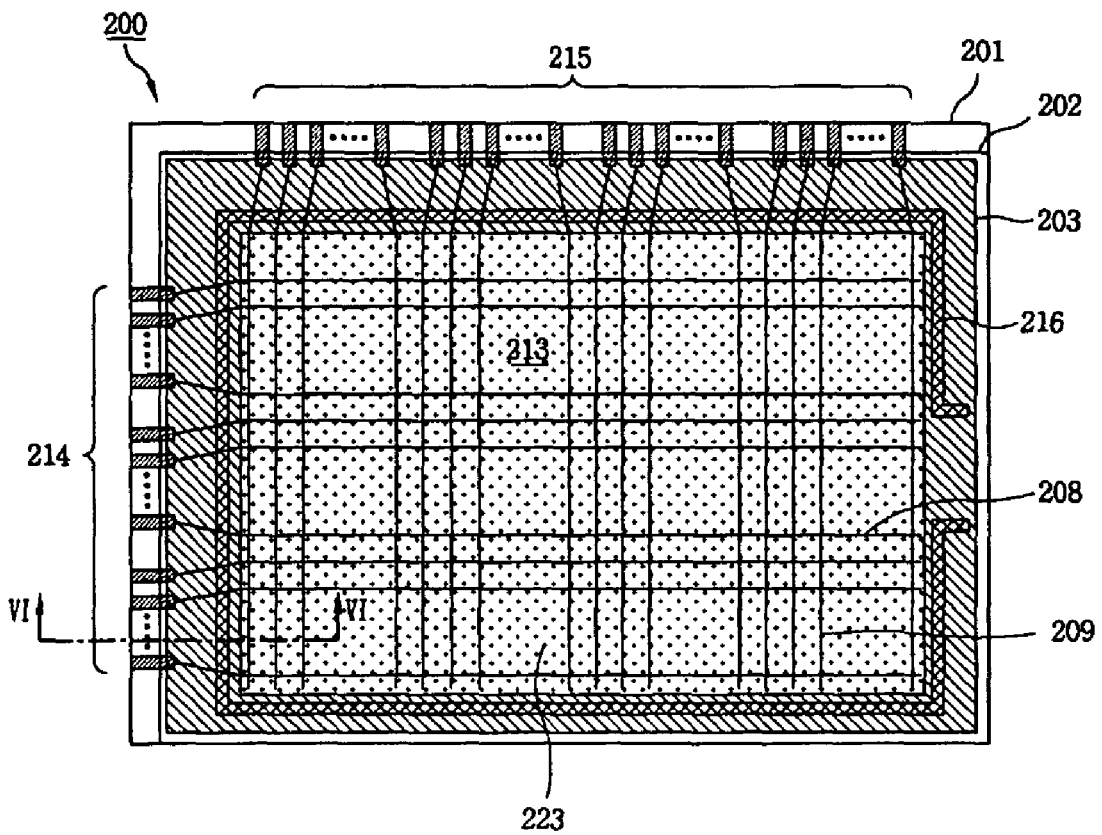
FIG. 4 is a schematic plan view showing an in-plane switching mode LCD device in accordance with an embodiment of the present invention.

FIG. 4 is a schematic plan view showing an in-plane switching mode LCD device in accordance with an embodiment of the present invention. As shown in FIG. 4, an upper substrate 202 and a lower substrate 201 are attached by a sealant 216. The lower substrate 201 includes an array region 213 with liquid crystal cells are arranged in a matrix, gate pads 214 connected to gate lines 208 of the array region 213 and a data pads 215 connected to the data lines 209. The gate pads 214 and the data pads 215 are formed along a peripheral region of the lower substrate 201, which does not overlap the upper substrate 202. Each of the gate pads 214 supplies a gate signal from a gate driver IC to one of the gate lines 208 in the array region 213. Each of the data pads 215 supplies a data signal from a data driver IC to one of the data lines 209 in the array region 213.

As for the upper substrate 202, although not shown in detail in FIG. 4, a metallic black matrix 203 is positioned along an outer edge of the array region 213 and overlaps the sealant 216. The black matrix 203 is made of Cr or $CrO_x$. An organic layer 223 is formed on the array region 213 overlapped by the black matrix 203. The organic layer 223 is formed so that the metallic black matrix 203 does not affect the lateral electric field between the common electrode and the pixel electrode. That is, in the in-plane switching mode LCD device, because the pixel electrode and the common electrode are formed together on the lower substrate, when a voltage is applied to the two electrodes, a lateral electric field is generated. Thus, if the organic layer were not formed to shield the common electrode and the pixel electrode, the black matrix 203 would affect the lateral electric field and cause cross-talk.

Figure 5:
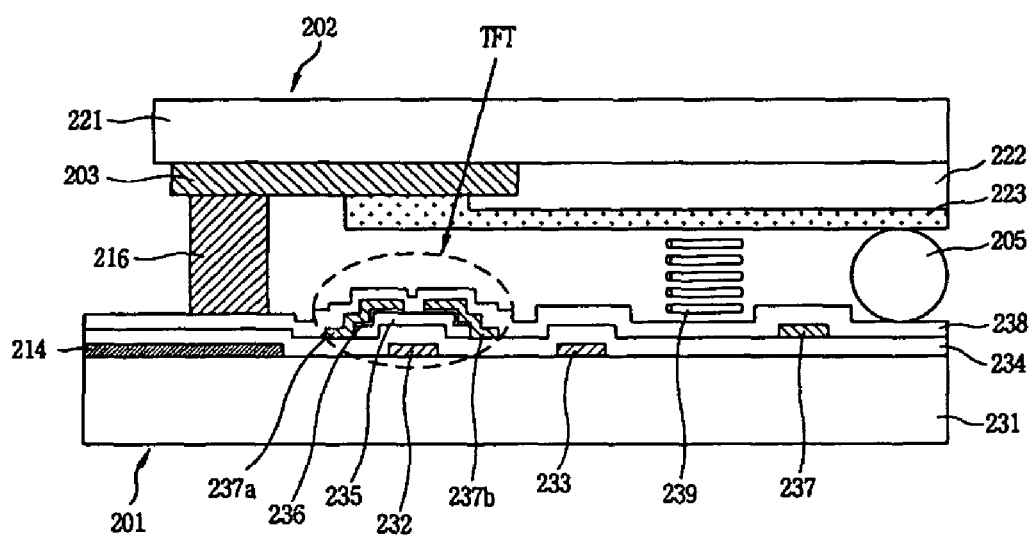
FIG. 5 is a sectional view along line VI-VI in the liquid crystal display panel shown in FIG. 4.

FIG. 5 is a sectional view along line VI-VI in the liquid crystal display panel shown in FIG. 4. As shown in FIG. 5, in the in-plane switching mode LCD device, a liquid crystal layer 239 is filled between the upper substrate 202 and the lower substrate 201. The sealant 216 along the outer edges of the upper substrate 202 and the lower substrate 201 holds the liquid crystal in place. A specified cell gap is maintained by a spacer 205 disposed within the liquid crystal 239. The lower substrate 201 includes a transparent substrate 231, a gate pad 214, to which a scan signal is applied from the gate driver IC, a thin film transistor TFT, a common electrode 233 and a pixel electrode 237.

The TFT includes a gate electrode 232, a source electrode 237a, a drain electrode 237b and a semiconductor layer 235. A gate insulating layer 234 is formed between the gate electrode 232 and the semiconductor layer 235. An ohmic contact layer 236 is formed between the semiconductor layer 235 and the source and drain electrodes 237a and 237b.

Besides a ball spacer 205, the spacer may be a column spacer formed on the upper substrate 202. Also, in the array region, the common electrode 233, which is formed when the gate electrode 232 is formed, and the pixel electrode 237, which is formed when the source and drain electrodes 237a and 237b are formed, are spaced apart at a specified interval across the lower substrate 201.

Referring to the upper substrate 202, the black matrix 203 is formed of Cr or $CrO_x$ and formed on a transparent substrate 221. Color filters 222 of R (red), G (green) and B (blue) are formed alternately in the array region within the black matrix 203. In FIG. 5, only one unit pixel is shown. However, throughout the entire array region, R, G and B color filters 222 are formed and the black matrix 203 is formed at portions corresponding to the borders of the color filter 222.

Figure 6:
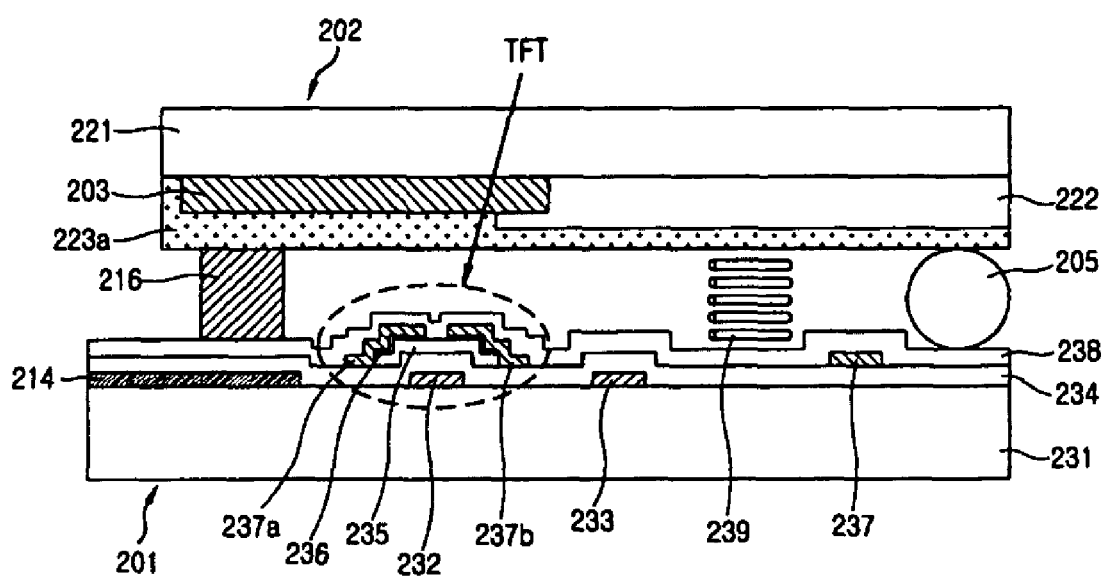
FIG. 6 is a cross-sectional view showing another embodiment of the present invention.

The black matrix 203 is also formed at the outer edge of the array region 213 to overlap and contact the sealant 216. The organic layer 223 is formed on the black matrix 203 and the color filter 222. Since the black matrix 203 is formed of a metal material, such as Cr or $CrO_x$, that directly contacts the sealant 216, the adhesive strength between the black matrix 203 and the sealant 216 is improved compared to the case of using a resin black matrix. Accordingly, sealant breakage and liquid crystal leakage can be prevented. In addition, because the organic film is formed on the metallic black matrix, distortion of the lateral electric field between the common electrode and the pixel electrode due to the black matrix can be prevented. In the alternative, as shown in FIG. 6, the organic layer 223a can be formed over the entire upper substrate 202 including the sealant 216.

Figure 7A:
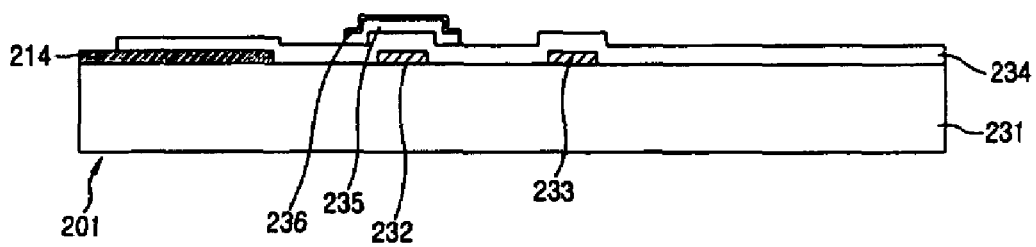
FIGS. 7A to 7C are processing views of the LCD device in accordance an embodiment of the present invention.

The fabrication method of the in-plane switching mode LCD device in accordance with the present invention will now be described with reference to FIGS. 7A to 7C. First, as shown in FIG. 7A, after depositing a metal material, such as Al, Mo, Ta, Ti, Cr, Cu or Al alloy, on the transparent substrate 231, the gate pad 214, the gate line (not shown), the gate electrode 232 of the thin film transistor and the common electrode 233 are formed. At this time, the gate pad 214 is formed at an end of the gate line for supplying a scan signal from the gate driver IC to the gate line.

Next, a gate insulating layer 234 is formed by depositing $SiN_x$ or $SiO_x$ and the like on the structure by a plasma chemical vapor deposition method. A part of the gate pad 214 is then exposed to be connected to the gate driver IC (not shown). Subsequently, amorphous silicon and n$^+$ amorphous silicon are deposited on the gate insulating layer 234 and patterned to form the semiconductor layer 235 and the ohmic contact layer 236.

Figure 7B:
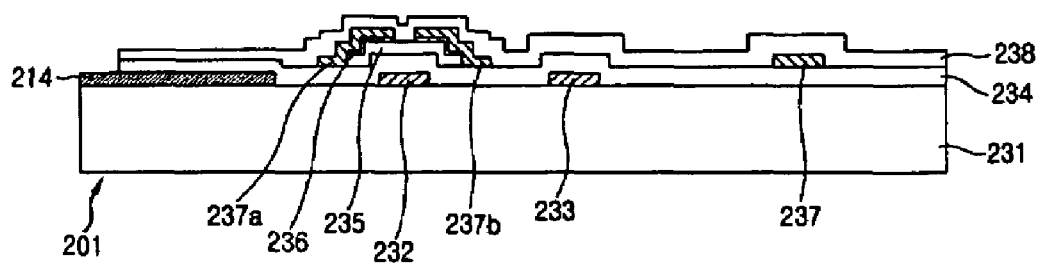

Subsequently, as shown in FIG. 7B, a metal layer, such as Al, Cr, Ti, Ta, Cu, Mo or Al alloy, is deposited on the structure by a sputtering method and then patterned to form the data pad (not shown), the source and drain electrode 237a and 237b of the thin film transistor and the pixel electrode 237. Thereafter, the ohmic contact layer 236 is etched by using the source and drain electrodes 237a and 237b as a mask. When the source and drain electrodes 237a and 237b are formed, the data lines (not shown) are also simultaneously formed.

A passivation layer 238 is then formed over the entire surface of the substrate containing the thin film transistor. At this time, the passivation layer 238 is partially etched so as to expose the data pad for connection to the data driver IC. The common electrode 233 and the pixel electrode 237 may be formed at the same time that the source and drain electrodes 237a and 237b are formed on the passivation layer 238. The common electrode 233 and the pixel electrode 237 may be transparent electrodes, such as ITO or IZO. Or, at least one of the common electrode 233 and the pixel electrode 237 may be formed as a transparent electrode.

Figure 7C:
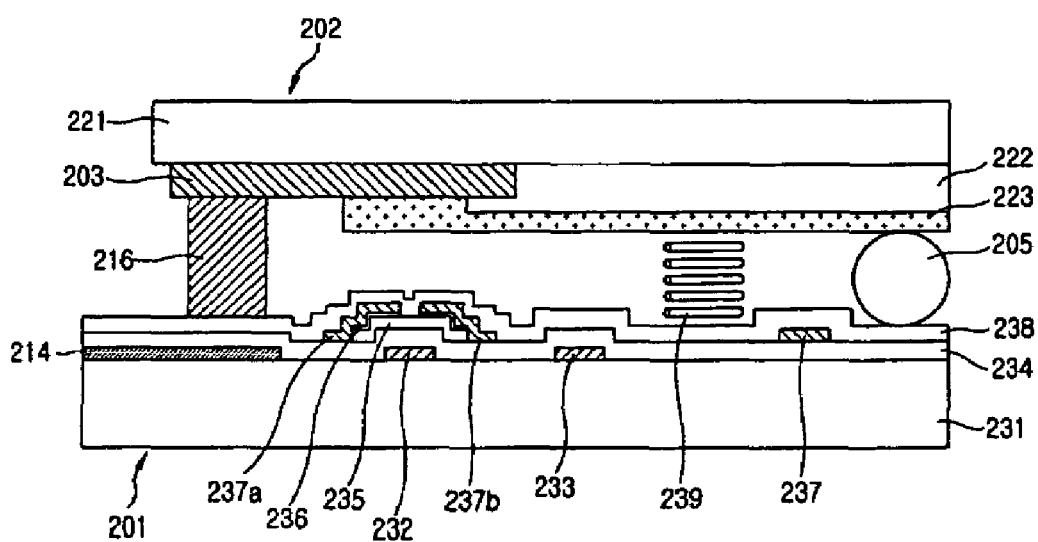

Then, as shown in FIG. 7C, Cr or $CrO_x$ is deposited by a sputtering method and patterned to form the black matrix 203 at regions corresponding to the outer edge of the array region, the thin film transistor and the gate/data lines of the lower substrate 201. And then, color filters 222 are formed within the black matrix 203 in the array region. The organic layer 223 is then formed on the black matrix 203 and the color filters 222 by spin coating to fabricate the color filter substrate 202. The organic layer 223 may be formed only in the array region or over the entire surface of the substrate including the black matrix 203 formed at the outer edge of the array region. Thereafter, the color filter substrate 202 and the thin film transistor substrate 201 are positioned to face each other. Then, an edge portion of the two substrates are attached by using the sealant 216, such as an epoxy resin.

The in-plane switching mode liquid crystal display device and its fabrication method of the present invention have particular advantages over related art arrangements and methodologies. For example, the metallic black matrix is used instead of the resin black matrix to prevent a liquid crystal leakage. Further, the organic film is formed on the metallic black matrix to remove the influence of the metallic black matrix on the lateral electric field between the pixel electrode and the common electrode to thereby prevent cross-talk.

It will be apparent to those skilled in the art that various modifications and variations can be made in the in-plane switching mode liquid crystal display device and fabrication method thereof in the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device comprising:

first and second substrates having an array region and a sealant region along a periphery of the array region, wherein the array region includes a plurality of pixel regions defined by a plurality of gate lines and data lines on the second substrate and the sealant region includes a plurality of gate pads and data pads at an end of the gate and data lines;

a sealant in the sealant region attaching the first and second substrates, wherein the sealant is located over the gate and data pads;

a single metallic black matrix formed in the sealant region that extends into the array region of the first substrate, the single metallic black matrix having a first portion and a second portion in the sealant region;

a color filter on the metallic black matrix extending into the array region from the sealant region;

a common electrode and a pixel electrode on the second substrate in the array region;

an organic layer on the color filter in the array region, the organic layer covering the first portion of the single metallic black matrix to shield an electric field in the array region, wherein the organic layer is formed in the array region; and a liquid crystal layer between the first and second substrates, wherein the sealant is disposed in the second portion of the metallic black matrix and the organic layer is formed in a part area of the second portion of the metallic black matrix so that a part area of the metallic black matrix is exposed.

2. The device of claim 1, wherein the metallic black matrix is one of Cr and $CrO_x$.

3. The device of claim 1, wherein the organic layer is formed in the array region.

4. The device of claim 3, wherein the organic layer is in direct contact with the metallic black matrix.

5. The device of claim 1, wherein the organic layer is in direct contact with the sealant.

6. The device of claim 1, wherein the black matrix extends over at least one thin film transistor in the array region.

7. A method for fabricating an in-plane switching mode liquid crystal display device, comprising:

providing first and second substrates having a sealant region and an array region, wherein the array region includes a plurality of pixels defined by a plurality of gate lines and data lines on the second substrate and the sealant region includes a plurality of gate pads and data pads at an end of the gate and data lines;

forming a single metallic black matrix in the sealant region that extends into the array region of the first substrate, the single metallic black matrix having a first portion and a second portion in the sealant region;

forming a color filter on the single metallic black matrix extending into the array region from the sealant region, wherein the organic layer is formed in the sealant region and the array region;

forming a pixel electrode and a common electrode on the second substrate in the array region;

forming an organic layer on the color filter in the array region, the organic layer covering the first portion of single the metallic black matrix to shield an electric field in the array region, wherein the organic layer is formed in the sealant region;

forming a sealant over the gate and data pads of the sealant region; and attaching the first and second substrates by the sealant, wherein the sealant is disposed in the second portion of the metallic black matrix and the organic layer is formed in a part area of the second portion of the metallic black matrix so that a part area of the metallic black matrix is exposed.

8. The method of claim 7, wherein the metallic black matrix is one of Cr and $CrO_x$.

9. The method of claim 7, wherein the organic layer is formed in the array region.

10. The method of claim 7, further comprising:

forming a liquid crystal layer between the first and second substrates.

11. The device of claim 7, wherein the black matrix extends over at least one thin film transistor in the array region.

* * * * *